United States Patent
Qi et al.

(10) Patent No.: US 12,480,179 B2
(45) Date of Patent: Nov. 25, 2025

(54) METHOD FOR LITHIUM RECOVERY BY EXTRACTION-STRIPPING SEPARATION AND PURIFICATION

(71) Applicants: INSTITUTE OF PROCESS ENGINEERING, CHINESE ACADEMY OF SCIENCES, Beijing (CN); SHANGHAI YIDING NEW MATERIAL TECHNOLOGY CO., LTD, Shanghai (CN)

(72) Inventors: Tao Qi, Beijing (CN); Zhaowu Zhu, Beijing (CN); Jian Zhang, Beijing (CN); Daoyong Lin, Beijing (CN)

(73) Assignees: INSTITUTE OF PROCESS ENGINEERING, CHINESE ACADEMY OF SCIENCES, Beijing (CN); SHANGHAI YIDING NEW MATERIAL TECHNOLOGY CO., LTD, Shanghai (CN)

( * ) Notice: Subject to any disclaimer, the term of this patent is extended or adjusted under 35 U.S.C. 154(b) by 692 days.

(21) Appl. No.: 17/773,593

(22) PCT Filed: Oct. 29, 2020

(86) PCT No.: PCT/CN2020/124747
§ 371 (c)(1),
(2) Date: Apr. 29, 2022

(87) PCT Pub. No.: WO2021/083263
PCT Pub. Date: May 6, 2021

(65) Prior Publication Data
US 2022/0372592 A1 Nov. 24, 2022

(30) Foreign Application Priority Data
Nov. 1, 2019 (CN) .......................... 201911061643.6

(51) Int. Cl.
*C22B 26/12* (2006.01)
*C22B 3/04* (2006.01)
*C22B 3/26* (2006.01)

(52) U.S. Cl.
CPC ................. *C22B 26/12* (2013.01); *C22B 3/04* (2013.01); *C22B 3/37* (2021.05)

(58) Field of Classification Search
CPC .......... C22B 26/12; H01M 6/52; H01M 10/54
See application file for complete search history.

(56) References Cited

U.S. PATENT DOCUMENTS 6,261,712 B1 * 7/2001 Hayashi ................ H01M 10/54
429/231.95
2011/0200508 A1 8/2011 Harrison et al.

FOREIGN PATENT DOCUMENTS

CN 104745823 A 7/2015
CN 104884648 A 9/2015
(Continued)

OTHER PUBLICATIONS

Zhou, Zhiyong, et al. "Selective extraction of lithium ion from aqueous solution with sodium phosphomolybdate as a coextraction agent." ACS Sustainable Chemistry & Engineering 7.9 (2019): 8885-8892. (Year: 2019).*

(Continued)

*Primary Examiner* — Sally A Merkling
*Assistant Examiner* — Sean P. O'Keefe
(74) *Attorney, Agent, or Firm* — McCarter & English, LLP; Yu Lu; James M. Alburger

(57) ABSTRACT

The present disclosure relates to a method for lithium recovery by extraction-stripping separation and purification, including: (1) performing an extraction on a lithium-containing solution using an extraction system including a composite extractant at a pH in a range of 10-13 and (Continued)

separating to obtain a lithium-loaded organic phase; (2) subjecting the lithium-loaded organic phase obtained in step (1) to a gas-liquid-liquid three-phase stripping to obtain a lithium-loaded stripping solution; and (3) subjecting the stripping solution obtained in step (2) to a thermal treatment and separating to obtain a lithium product and a separated mother liquor.

16 Claims, 2 Drawing Sheets

(56) References Cited

FOREIGN PATENT DOCUMENTS

| CN | 105039743 | A | * | 11/2015 | |
|---|---|---|---|---|---|
| CN | 107779612 | A | | 3/2018 | |
| CN | 107937734 | A | | 4/2018 | |
| CN | 108004420 | A | | 5/2018 | |
| CN | 108423696 | A | | 8/2018 | |
| CN | 109244588 | A | * | 1/2019 | ............. C01D 15/08 |
| CN | 110240183 | A | | 9/2019 | |
| CN | 110656239 | A | | 1/2020 | |
| KR | 101384803 | B1 | | 4/2014 | |
| TW | I667056 | B | | 8/2019 | |

OTHER PUBLICATIONS

CN107937734A English language translation (Year: 2018).*
International Search Report and Written Opinion for Application No. PCT/CN2020/124747, dated Jan. 25, 2021, 9 pages.

* cited by examiner

METHOD FOR LITHIUM RECOVERY BY EXTRACTION-STRIPPING SEPARATION AND PURIFICATION

CROSS REFERENCE TO RELATED APPLICATION

This patent application is a U.S. National Stage Application filed under 35 U.S.C. 371 (c) based on International Patent Application No. PCT/CN2020/124747, filed on Oct. 29, 2020, which claims the benefit and priority of Chinese Patent Application No. 201911061643.6, entitled "Method for lithium recovery by extraction-stripping separation and purification" filed on Nov. 1, 2019, the disclosure of each of which is incorporated by reference herein in its entirety as part of the present application.

TECHNICAL FIELD

The present disclosure relates to the technical field of chemical separation, and in particular to a method for lithium recovery by extraction-stripping separation and purification.

BACKGROUND ART

Lithium is a metal with the smallest density and is widely used in the fields of electronics, chemistry, renewable energy and pharmaceuticals. Lithium resources mainly come from salt lakes, hard rock minerals and seawater. In recent years, with the promotion of waste resources recycling, the spent lithium batteries have also become an important source. Multiple purification steps are required in the process for lithium recovery from these raw materials. In a most conventional process, highly pure lithium solution is obtained by evaporated concentration, impurity removal and deep removal of calcium and magnesium. Then the lithium-containing solution is subjected to a precipitation treatment to obtain a lithium carbonate product.

CN108423696A disclosed a method for producing a highly pure lithium salt from a lithium-containing solution, involving the following steps: using a pH regulator system to adjust the solution pH value above 4; concentrating the adjusted solution to a concentrated solution with a lithium concentration of greater than 2 g/L; placing an ultrasonic oscillating device into the lithium concentrated solution and precipitating under ultrasonic oscillation; then filtering, washing and drying to obtain a lithium salt. The method requires evaporating concentration of the lithium solution, lowering the processing capacity. At the same time, during lithium precipitation, large amounts of sodium, potassium and other impurity ions can be entrained in the lithium precipitates, impacting the purity of lithium products. To prepare highly pure lithium salts, a large amount of freshwater has to be used for washing, leading to extensive water consumption. In addition, a large amount of lithium still remains in the mother liquor due to that lithium salt has certain water solubility, resulting in a decrease in the lithium yield.

CN104884648A provides a method for lithium recovery from a lithium solution containing carbonates, involving the following steps: evaporating the lithium solution to obtain a first lithium precipitate with lithium concentration remaining less than or equal to 2.481 g/L; separating the solid and liquid to obtain a lithium concentrated solution and a lithium carbonate precipitate; adding a phosphate salt to the concentrated lithium solution, so that the dissolved lithium is precipitated as lithium phosphate; re-concentrating the filtration solution to further precipitate lithium until its concentration is less than or equal to 2.481 g/L to obtain a second precipitate; carrying out solid-liquid separation for the second precipitation and adding seed particles to the re-concentrated filtered solution, so that the dissolved lithium is precipitated again as lithium phosphate. In the method, operations of concentration and solid-liquid separation are carried out many times, resulting in that the yield of lithium is low, the technological process is long, and the investment cost is high, which is unfeasible to industrial application.

Based on the above literature, it is known that to develop a process with high lithium yield, high product purity, large processing capacity, short process, low investment cost and easy industrial production is a big problem to be urgently solved at present.

SUMMARY

In view of the problems existing in prior art, the present disclosure provides a method for lithium recovery by extraction-stripping separation and purification. In the method, an extraction system comprising a composite extractant is used to extract lithium from a solution under high pH value, so as to realize the efficient extraction of lithium and to separate lithium from large amounts of impurities such as Na, K and B. Moreover, the industrial exhaust gases can be used to perform a gas-liquid-liquid three-phase stripping through a multi-stage continuous countercurrent process to achieve the efficient stripping of lithium. The method in the present disclosure realizes a large processing capacity, recycling of the liquid phase and high total yield of lithium; the recycling of the gas phase achieves near-zero discharge and high utilization rate; the industrial tail gases can be used as the gas source of the three-phase stripping, greatly reducing cost and protecting environment; meanwhile, the technological process is short, the equipment is simple, the investment cost is low, and the industrial application may be readily realized.

In order to achieve this objective, the present disclosure provides the following technical solutions.

The present disclosure provides a method for lithium recovery by extraction-stripping separation and purification, comprising:

(1) performing an extraction on a lithium-containing solution using an extraction system comprising a composite extractant at a pH in a range of 10-13 and separating to obtain a lithium-loaded organic phase;

(2) subjecting the lithium-loaded organic phase obtained in step (1) to a gas-liquid-liquid three-phase stripping to obtain a lithium-loaded stripping solution; and (3) subjecting the stripping solution obtained in step (2) to a thermal treatment and separating to obtain a lithium product and a separated mother liquor.

In some embodiments, in step (1), the composite extractant comprises a neutral extractant and a chelating extractant, and the extraction system comprises the composite extractant and a diluent.

In some embodiments, the neutral extractant comprises any one or a combination of at least two selected from the group consisting of tributyl phosphate TBP, di(1-methylheptyl) methyl phosphonate P350, trioctylphosphine oxide TOPO, trioctyl/trihexyl phosphine oxide Cyanex 923 and N,N-di(1-methyl heptyl) acetamide N503.

In some embodiments, the chelating extractant comprises any one or a combination of at least two selected from the group consisting of 2-hydroxy-5-nonylacetophenone oxime LIX84, dodecyl phenyl-methyl-β-diketone LIX54, 2-hydroxy-5-nonylbenzaldehyde oxime LIX860 and an extractant having the same functional group to 2-hydroxy-5-nonylacetophenone oxime LIX84, dodecyl phenyl-methyl-β-diketone LIX54 or 2-hydroxy-5-nonylbenzaldehyde oxime LIX860.

In some embodiments, a volume ratio of the neutral extractant to the chelating extractant is in a range of 0.2:1-2:1.

In some embodiments, the extraction system further comprises a phase modifier.

In some embodiments, the extraction system comprises a composite extractant, a phase modifier and a diluent; a volume percentage of the composite extractant in the extraction system is in a range of 5-30%, and a volume percentage of the phase modifier is in a range of 0-10%.

In some embodiments, in step (1), the lithium-containing solution comprises any one or a combination of at least two selected from the group consisting of lithium ore leaching solution, lithium-precipitated mother liquor, lithium battery waste leaching solution and salt lake brine.

In some embodiments, a concentration of lithium in the lithium-containing solution is in a range of 0.25-5 g/L.

In some embodiments, concentrations of main impurity elements of sodium, potassium and boron in the lithium-containing solution are independently in ranges of 10-150 g/L, 0-50 g/L and 0-10 g/L, respectively.

In some embodiments, the lithium-containing solution further comprises metal ions such as rubidium ions, aluminum ions, magnesium ions, cesium ions and calcium ions.

In some embodiments, a volume ratio of the lithium-containing solution to the organic phase of the extraction system is in a range of 0.2:1-5:1.

In some embodiments, in step (1), a concentration of lithium in the lithium-loaded organic phase is in a range of 0.5-3 g/L.

In some embodiments, step (1) further comprises washing the lithium-loaded organic phase.

In some embodiments, the washing solution is water and/or a lithium-containing solution.

In some embodiments, in step (2), the gas-liquid-liquid three-phase stripping system comprises a first liquid phase, a second liquid phase and a gas phase.

In some embodiments, gas in the gas phase comprises any one or a combination of at least two selected from the group consisting of $SO_2$, $SO_3$, $CO_2$ and $Cl_2$.

In some embodiments, the gas in the gas phase is $SO_2$ and/or $CO_2$.

In some embodiments, the first liquid phase comprises water.

In some embodiments, the second liquid phase comprises the lithium-loaded organic phase.

In some embodiments, the gas-liquid-liquid three-phase stripping is controlled at a pH in a range of 6-9.

In some embodiments, a volume ratio of the first liquid phase to the second liquid phase is in a range of 0.05:1-2:1.

In some embodiments, in step (2), the gas-liquid-liquid three-phase stripping is operated in a multi-stage continuous countercurrent mode.

In some embodiments, an equipment for the gas-liquid-liquid three-phase stripping comprises any one of a continuous mixing clarification tank, an extraction tower or a centrifugal extractor; a stage number of the gas-liquid-liquid three-phase stripping is adjustable between 1 and 10.

In some embodiments, in step (2), a concentration of lithium in the stripping solution is more than 5 g/L.

In some embodiments, in step (3), the thermal treatment is performed by any one or a combination of at least two selected from the group consisting of oxidation, evaporative crystallization and thermal decomposition.

In some embodiments, the thermal treatment is performed at a temperature in a range of 60-90° C.

In some embodiments, the thermal treatment is performed for 0.5-2 h.

In some embodiments, an oxidant used in the oxidation comprises air, oxygen and ozone gas.

In some embodiments, the evaporative crystallization is performed by MVR or multi-effect evaporation.

In some embodiments, the thermal decomposition is performed in a closed or semi-closed container.

In some embodiments, in step (3), the separation is performed by any one or a combination of at least two selected from the group consisting of filtration, suction filtration and centrifugation.

In some embodiments, the lithium product comprises lithium sulfate, lithium chloride or lithium carbonate, and the product has a purity of higher than 96%.

In some embodiments, in step (3), the separated mother liquor is returned to step (1) and/or the first liquid phase in step (2).

Compared with the prior art, the present disclosure has the following beneficial effects.

(1) According to the method for lithium recovery by extraction-stripping separation and purification in the present disclosure, the efficient separation of lithium from impurity ions such as Na, K and B is realized by using the composite extractant; further, by means of the gas-liquid-liquid three-phase continuous stripping, the stripping rate of lithium is 90% or higher, the recycling of liquid phase and gas phase is achieved, the total yield of lithium is 83% or higher, and the purity of the obtained lithium product is 96% or higher.

(2) In the present disclosure, the method provided has the advantages of large processing capacity, simple process and equipment, low investment cost and low energy consumption, can be used for continuous production, and has a high application promise.

DETAILED DESCRIPTION OF THE EMBODIMENTS

Figure 1:
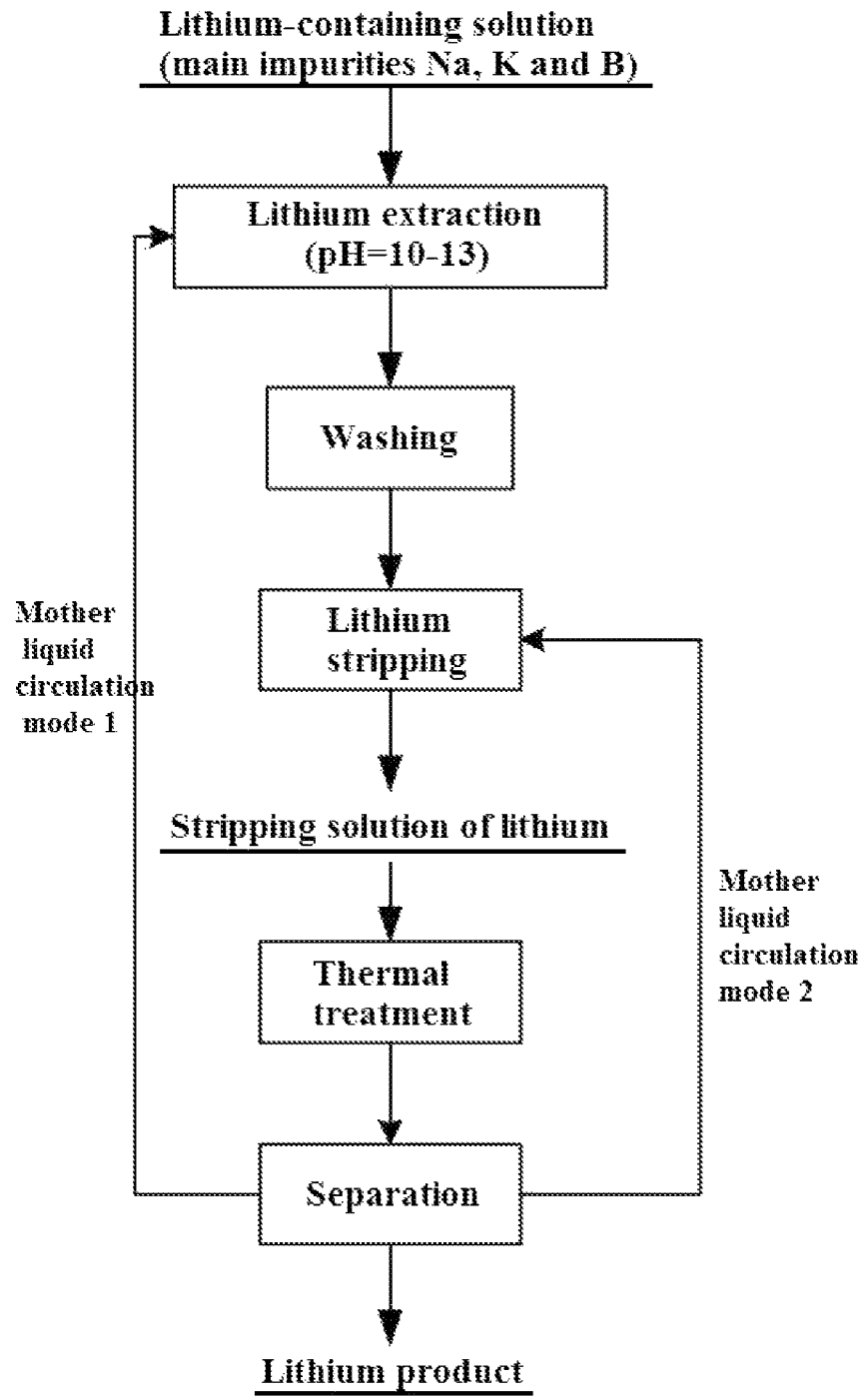
FIG. 1 shows a process flow diagram of the method for lithium recovery by extraction-stripping separation and purification according to the present disclosure.

The present disclosure provides a method for lithium recovery by extraction-stripping separation and purification, comprising:

(1) performing an extraction on a lithium-containing solution using an extraction system comprising a composite extractant at a pH in a range of 10-13 and separating to obtain a lithium-loaded organic phase;

(2) subjecting the lithium-loaded organic phase obtained in step (1) to a gas-liquid-liquid three-phase stripping to obtain a lithium-loaded stripping solution; and (3) subjecting the stripping solution obtained in step (2) to a thermal treatment and separating to obtain a lithium product and a separated mother liquor.

In the method as provided in the present disclosure, an extraction system comprising a composite extractant is used under a relatively high pH value, and lithium is efficiently extracted by the composite extractant into a loaded organic phase. Subsequently, the lithium-loaded organic phase is subjected to a gas-liquid-liquid three-phase stripping with an acid gas as the gas phase. The gas may dissolve in the liquid phase to provide a small amount of $H^+$. $H^+$ contacts with the lithium-loaded organic phase and exchanges with $Li^+$, and $Li^+$ is stripped into an aqueous solution. The consumed $H^+$ is supplemented through a continuous reaction of the gas. $Li^+$ stripped into the aqueous phase combines with the anions generated from the gas-liquid reaction to form a lithium-loaded aqueous solution. The lithium-loaded aqueous solution is subjected to a thermal treatment to obtain a lithium product with relatively high purity.

In some embodiments, in step (1), the composite extractant comprises a neutral extractant and a chelating extractant, and the extraction system comprises the composite extractant and a diluent. Lithium and the neutral extractant form a sandwich compound at a pH in a range of 10-13, and the sandwich compound is extracted by the chelating extractant, thereby realizing efficient extraction of lithium. The extraction reaction is shown in formula (1):

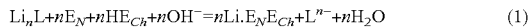

$$Li_nL + nE_N + nHE_{Ch} + nOH^- = nLi \cdot E_N E_{Ch} + L^{n-} + nH_2O \quad (1)$$

In formula (1), L represents $Cl^-$ or $SO_4^{2-}$, $E_N$ represents a neutral extractant, and $HE_{Ch}$ represents a chelating extractant.

Since the ions such as Na, K and B ions do not form a sandwich compound with $E_N$, thus cannot be extracted by the composite extractant, Li is well separated from the impurity elements such as Na, K and B.

In the present disclosure, the extraction process is carried out under the strong alkaline conditions, at a pH in a range of 10-13, for example 10, 11, 12 or 13. When pH is less than 10, the sandwich compound formed by lithium during the extraction cannot effectively neutralize $H^+$ produced by $HE_{Ch}$, and lithium cannot be effectively extracted. When pH is more than 13, a large amount of ions such as $Na^+$ and $K^+$ also form $NaE_{Ch}$ or $KE_{Ch}$ with $HE_{Ch}$, and lithium cannot be extracted efficiently or well separated from Na and K, either.

In some embodiments, the neutral extractant comprises any one or a combination of at least two selected from the group consisting of tributyl phosphate (TBP), di(1-methylheptyl) methyl phosphonate (P350), trioctylphosphine oxide (TOPO), trioctyl/trihexyl phosphine oxide (Cyanex 923) and N,N-di(1-methyl heptyl) acetamide (N503), in which typical but non-limiting combination comprises P350 and N503; TBP and TOPO; TBP, P350 and Cyanex923; P350, Cyanex923 and N503.

In some embodiments, the chelating extractant comprises any one or a combination of at least two selected from the group consisting of 2-hydroxy-5-nonylacetophenone oxime (LIX84), dodecyl phenyl-methyl-β-diketone (LIX54), 2-hydroxy-5-nonylbenzaldehyde oxime (LIX860) and an extractant having the same functional group to 2-hydroxy-5-nonylacetophenone oxime (LIX84), dodecyl phenyl-methyl-β-diketone (LIX54) or 2-hydroxy-5-nonylbenzaldehyde oxime (LIX860), in which the typical but non-limiting combination comprises LIX54 and LIX84I; LIX54 and LIX860; LIX54, LIX84I and LIX860.

In some embodiments, a volume ratio of the neutral extractant to the chelating extractant is in a range of 0.2:1-2:1. For example, the volume ratio may be 0.2:1, 0.3:1, 0.5:1, 0.8:1, 1:1, 1.2:1, 1.5:1, 1.8:1 or 2:1.

In some embodiments, the extraction system further comprises a phase modifier.

In some embodiments, the extraction system comprises a composite extractant, a phase modifier and a diluent, in which the volume percentages of the composite extractant and the phase modifier are independently in ranges of 5-30% and 0-10%, respectively. For example, the volume percentage of the composite extractant may be 5%, 10%, 15%, 20%, 25% or 30%, and the volume percentage of the phase modifier may be 0%, 0.5%, 1%, 3%, 5%, 8%, 9% or 10%. According to the occurrence of "emulsification" problem in the extraction system, whether to add a phase modifier and the volume ratio of the phase modifier are determined.

In the present disclosure, there are no special restrictions for the specific species of the diluent and the phase modifier, and the ones common known to those skilled in the art are all applicable to the present disclosure. As a specific embodiment of the present disclosure, the diluent is n-dodecane or sulfonated kerosene, and the phase modifier is dodecanol.

In some embodiments, in step (1), the lithium-containing solution comprises any one or a combination of at least two selected from the group consisting of lithium ore leaching solution, lithium-precipitated mother liquor, lithium battery waste leaching solution and salt lake brine, in which the typical but non-limiting combination comprises lithium ore leaching solution and lithium-precipitated mother liquor; salt lake brine; salt lake brine and lithium-precipitated mother liquor; lithium battery waste leaching solution; lithium battery waste leaching solution and lithium-precipitated mother liquor.

In some embodiments, a concentration of lithium in the lithium-containing solution is in a range of 0.25-5 g/L. For example, the concentration of lithium may be 0.25 g/L, 0.3 g/L, 0.5 g/L, 0.8 g/L, 1 g/L, 1.5 g/L, 2 g/L, 2.5 g/L, 3 g/L, 3.5 g/L, 4 g/L, 4.5 g/L, 4.8 g/L or 5 g/L.

In some embodiments, concentrations of main impurity elements sodium, potassium and boron in the lithium-containing solution are independently in ranges of 10-150 g/L, 0-50 g/L and 0-10 g/L, respectively. For example, the concentration of sodium may be 10 g/L, 15 g/L, 20 g/L, 30 g/L, 50 g/L, 80 g/L, 90 g/L, 95 g/L, 100 g/L, 120 g/L, 140 g/L or 150 g/L; the concentration of potassium may be 0 g/L, 1 g/L, 5 g/L, 10 g/L, 15 g/L, 20 g/L, 30 g/L, 40 g/L, 45 g/L or 50 g/L; the concentration of boron may be 0 g/L, 1 g/L, 2 g/L, 3 g/L, 5 g/L, 7 g/L, 9 g/L or 10 g/L.

In some embodiments, the lithium-containing solution further comprises metal ions such as rubidium ions, aluminum ions, magnesium ions, cesium ions and calcium ions.

In some embodiments, a volume ratio of the lithium-containing solution to the organic phase of the extraction system is in a range of 0.2:1-5:1. For example, the volume ratio may be 0.2:1, 0.3:1, 0.5:1, 0.8:1, 1:1, 1.2:1, 1.5:1, 1.8:1, 2:1, 2.5:1, 3:1, 4:1 or 5:1. If the volume ratio is less than 0.2:1, lithium cannot be effectively extracted, and cannot be well separated from Na and K. If the volume ratio is more than 5:1, the single-stage extraction effect of lithium is poor, and the extraction yield of lithium is relatively low.

In some embodiments, in step (1), a concentration of lithium in the lithium-loaded organic phase is in a range of 0.5-3 g/L. For example, the concentration of lithium may be 0.5 g/L, 0.8 g/L, 1 g/L, 1.2 g/L, 1.5 g/L, 1.8 g/L, 2 g/L, 2.2 g/L, 2.6 g/L, 2.8 g/L or 3 g/L.

In some embodiments, the lithium-loaded organic phase is washed. Although the ions of such as Na, K and B are not extracted by the organic extraction system, the extraction process may bring an entrainment of phases. A small amount of impurities such as Na, K and B enter into the loaded organic phase with the entrained water, and thus the loaded organic phase needs to be washed so that the impurities are washed into the aqueous phase, and lithium is further purified.

In some embodiments, the washing solution is water and/or a lithium-containing solution.

In some embodiments, in step (2), the gas-liquid-liquid three-phase stripping system comprises a first liquid phase, a second liquid phase and a gas phase.

In some embodiments, the gas in the gas phase comprises any one or a combination of at least two selected from the group consisting of $SO_2$, $SO_3$, $CO_2$ and $Cl_2$, and is preferably $SO_2$ and/or $CO_2$.

In the present disclosure, among the gases used in the stripping, $SO_2$ and $SO_3$ are mostly tail gases produced by high-temperature treatment of sulfide ore in a metallurgical process, which are industrially used to prepare by-product sulfuric acid. In the preparation, $SO_2$ is oxidized into $SO_3$ by a catalyst and then absorbed to prepare sulfuric acid. The process is complex and the cost is high. $CO_2$ is mostly an exhaust gas from power plants and high-temperature boilers. The lime burning process also produces a large amount of $CO_2$ exhaust gas. $CO_2$ exhaust gas is currently discharged after purification treatment, producing greenhouse gases. $Cl_2$ is a by-product in the chlor-alkali industry. Currently, $Cl_2$ is used to prepare hydrochloric acid or disinfectants and is used in the chlorinated plastic industry. However, it is seriously in excess in China. In the present disclosure, the industrially produced tail gas or discharged greenhouse gas is utilized to realize the efficient stripping of lithium, which greatly reduces the operating cost and simultaneously reduces environmental pollution.

In some embodiments, the first liquid phase comprises water.

In some embodiments, the second liquid phase comprises the lithium-loaded organic phase.

In the present disclosure, the gas used in stripping may dissolve in the first liquid phase to provide a small amount of $H^+$. $H^+$ contacts with the lithium-loaded organic phase and exchanges with $Li^+$, and $Li^+$ is stripped into an aqueous solution. The consumed $H^+$ is supplemented through a continuous reaction of the gas. $Li^+$ stripped into the aqueous phase combines with the anions generated from the gas-liquid reaction to form a lithium-loaded aqueous solution. The stripping of lithium is shown in formula (2):

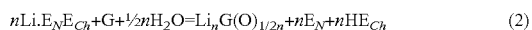

$$n\text{Li.E}_N\text{E}_{Ch} + G + \tfrac{1}{2}n\text{H}_2\text{O} = \text{Li}_n\text{G(O)}_{1/2n} + n\text{E}_N + n\text{HE}_{Ch} \qquad (2)$$

In formula (2), G represents a gas used in the stripping.

In some embodiments, the gas-liquid-liquid three-phase stripping is controlled at a pH in a range of 6-9. For example, the pH may be 6, 7, 8 or 9. The stripping of lithium is realized by a gas-liquid-liquid continuous three-phase reaction. During this process, $Li_nG(O)_{1/2n}$ is generated and is close to neutral or slightly alkaline, and the system automatically maintains close to neutral or weakly alkaline at a pH in a range of 6-9 in the stripping process. There is no need to add any other reagents for pH adjustment.

In some embodiments, a volume ratio of the first liquid phase to the second liquid phase is in a range of 0.05:1-2:1. For example, the volume ratio may be 0.05:1, 0.1:1, 0.5:1, 1:1, 1.5:1 or 2:1. If the volume ratio is less than 0.05:1, the effect of lithium stripping is poor. If the volume ratio is more than 2:1, the concentration of lithium in the stripping aqueous solution is low, and the recovery rate of lithium is low.

In some embodiments, in step (2), the gas-liquid-liquid three-phase stripping is operated in a multi-stage continuous countercurrent mode.

In some embodiments, an equipment used for the gas-liquid-liquid three-phase stripping comprises any one of a continuous mixing clarification tank, an extraction tower or a centrifugal extractor, and a stage number of the gas-liquid-liquid three-phase stripping is adjustable between 1 and 10. The equipment for the gas-liquid-liquid three-phase stripping is further preferably an extraction tower, the size and the number of stages of which may be adjusted according to the requirements in actual production processes.

In the present disclosure, by adjusting the number and/or the process parameters of the equipment for the gas-liquid-liquid three-phase stripping, the stripping rate of lithium may all reach 90% or higher.

In some embodiments, in step (2), a concentration of lithium in the stripping solution is more than 5 g/L. For example, the concentration of lithium may be 5.1 g/L, 5.2 g/L, 5.5 g/L, 5.8 g/L, 6.0 g/L, 6.5 g/L, 7.0 g/L, 9.0 g/L or 10 g/L.

In some embodiments, in step (3), the thermal treatment is performed by any one or a combination of at least two selected from the group consisting of oxidation, evaporative crystallization and thermal decomposition, in which the typical but non-limiting combination comprises thermal decomposition and evaporative crystallization, and oxidation and evaporative crystallization.

In some embodiments, in step (3), the thermal treatment is performed at a temperature in a range of 60-90° C. For example, the temperature may be 60° C., 65° C., 70° C., 75° C., 80° C., 85° C. or 90° C. If the temperature is lower than 60° C., the lithium product has a relatively low yield. If the temperature is higher than 90° C., the energy consumption in the thermal treatment section is increased.

In some embodiments, the thermal treatment is performed for 0.5-2 h. For example, the thermal treatment may be performed for 0.5 h, 1 h, 1.5 h or 2 h.

In the present disclosure, the thermal treatment is adjusted according to the species of the gas used for stripping. When $SO_2$ gas is used for stripping, a $Li_2SO_3$ solution is obtained, which is heated and oxidized to form $Li_2SO_4$, and is then subjected to evaporative crystallization to obtain a $Li_2SO_4$ product; when $SO_3$ gas is used for stripping, $Li_2SO_4$ is obtained, which is then subjected directly to evaporative crystallization to obtain a $Li_2SO_4$ product; when $CO_2$ gas is used for stripping, a $Li_2CO_3$ product is obtained through heating; when $Cl_2$ is used for stripping, a LiCl product is obtained.

In some embodiments, an oxidant used in the oxidation comprises air, oxygen and ozone gas.

In some embodiments, the evaporative crystallization is performed by MVR or multi-effect evaporation.

In some embodiments, the thermal decomposition is performed in a closed or semi-closed container.

In some embodiments, the separation is performed by any one or a combination of at least two selected from the group consisting of filtration, suction filtration and centrifugation, in which the typical but non-limiting combination comprises centrifugation and filtration, and centrifugation and suction filtration.

In some embodiments, the lithium product comprises lithium sulfate, lithium chloride or lithium carbonate, and the product has a purity of higher than 96%. For example, the purity may be 96.5%, 97%, 98% or 99%.

In some embodiments, in step (3), the separated mother liquor is returned to the lithium-containing solution in step (1) and/or to the first liquid phase in step (2), so as to improve the total yield of lithium and realize near-zero discharge of wastewater.

In some embodiments, the method provided in the present disclosure comprises the following steps:

(1) A neutral extractant and a chelating extractant are mixed to form a composite extractant, and a volume ratio of the neutral extractant to the chelating extractant is controlled to be in a range of 0.2:1-2:1. A diluent and a phase modifier are further added and mixed to form an extraction system, and the volume percentages of the composite extractant and the phase modifier are controlled independently to be in ranges of 5-30% and 0-10%, respectively. The extraction system is used to perform an extraction on a solution with a lithium concentration of 0.25-5 g/L at a pH in a range of 10-13, and a volume ratio of the lithium-containing solution to the organic phase is controlled to be in a range of 0.2:1-5:1. After separation, a loaded organic phase with a lithium concentration of 0.5-3 g/L is obtained.

The neutral extractant comprises any one or a combination of at least two selected from the group consisting of tributyl phosphate (TBP), di(1-methylheptyl) methyl phosphonate (P350), trioctylphosphine oxide (TOPO), trioctyl/trihexyl phosphine oxide (Cyanex 923) and N,N-di(1-methyl heptyl) acetamide (N503).

The chelating extractant comprises any one or a combination of at least two selected from the group consisting of 2-hydroxy-5-nonylacetophenone oxime (LIX84), dodecyl phenyl-methyl-β-diketone (LIX54), 2-hydroxy-5-nonylbenzaldehyde oxime (LIX860) and an extractant having the same functional group to 2-hydroxy-5-nonylacetophenone oxime (LIX84), dodecyl phenyl-methyl-β-diketone (LIX54) or 2-hydroxy-5-nonylbenzaldehyde oxime (LIX860).

(2) The lithium-loaded organic phase obtained in step (1) is washed, and then is subjected to a gas-liquid-liquid three-phase stripping in a continuous countercurrent extraction tower. The stripping system is controlled at a pH in a range of 6-9 to obtain a stripping solution with a concentration of lithium of more than 5 g/L.

The gas in the gas-liquid-liquid three-phase stripping system comprises any one or a combination of at least two selected from the group consisting of $SO_2$, $SO_3$, $CO_2$ and $Cl_2$.

(3) The stripping solution obtained in step (2) is subjected to a thermal treatment at a temperature in a range of 60-90° C. for 0.5-2 h, and is separated to obtain a lithium product and a separated mother liquor.

The technical solutions of the present disclosure will be further described below with reference to drawings and examples. Those skilled in the art should understand that the examples are only used to facilitate understanding of the present disclosure, and should not be construed as a limitation of the present disclosure.

A process flow diagram of the method for lithium recovery by extraction-stripping separation and purification according to the present disclosure is shown in FIG. 1. It shows that a lithium-containing solution is subjected to an extraction of lithium at a pH in a range of 10-13. Subsequently, the extracting solution is washed to remove impurities such as Na, K, and B, and is continuously stripped via a gas-liquid-liquid three-phase to obtain a lithium stripping solution. Then the lithium stripping solution is subjected to a thermal treatment and separated to obtain a lithium product. The separated mother liquor is returned to the step of lithium extraction according to circulation mode 1 and/or the step of lithium stripping according to circulation mode 2, thereby realizing a cyclic utilization.

Figure 2:
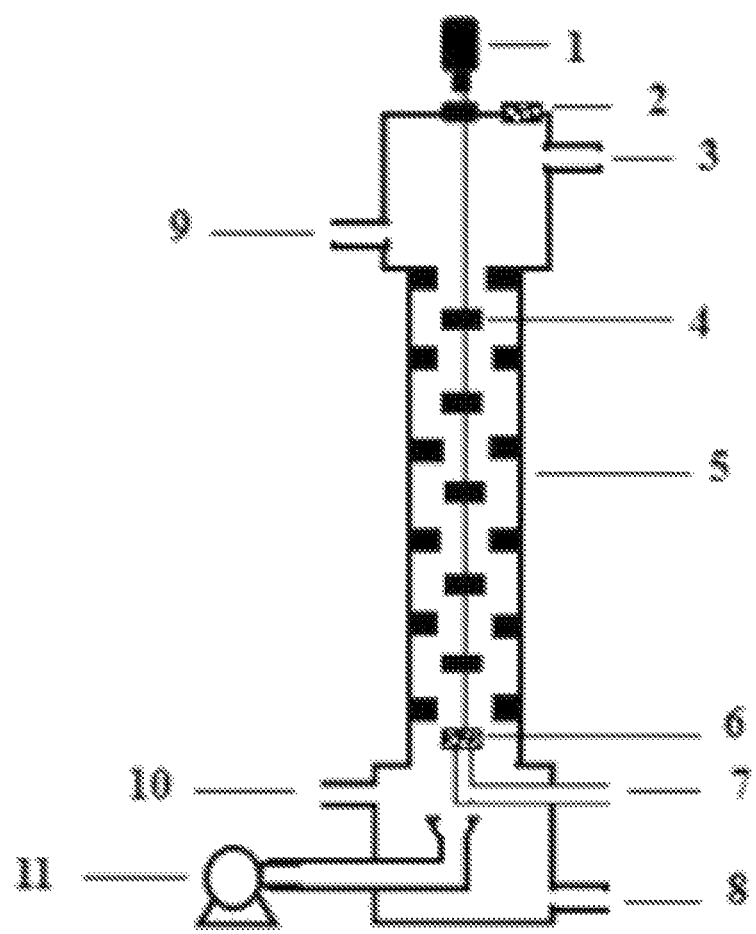
FIG. 2 shows an equipment schematic diagram of the gas-liquid-liquid three-phase stripping according to the present disclosure, in which: 1—electric agitator, 2—gas outlet, 3—light phase outlet, 4—stirring tower plate, 5—extraction tower body, 6—gas distributor, 7—gas inlet, 8—heavy phase outlet, 9—heavy phase inlet, 10—light phase inlet, and 11—pulsed system.

An equipment schematic diagram of the gas-liquid-liquid three-phase stripping according to the present disclosure is shown in FIG. 2. It shows that the equipment is an extraction tower. The gas phase enters the extraction tower through the gas inlet 7 at the bottom of the tower, and enters the extraction tower body 5 via the gas distributor 6 to contact and react with the liquid phase. The unreacted gas is discharged through the gas outlet 2 at the top of the tower. The first liquid phase enters the extraction tower through the light phase inlet 10 at the bottom of the tower, and is subjected to a stripping through the tower body. The stripping solution containing lithium is discharged through the light phase outlet 3. The second liquid phase enters the tower through the heavy phase inlet 9 at the top of the tower, and is subjected to the stripping. The solution after reaction is discharged through the heavy phase outlet 8. The tower plates in the tower body are adjusted to realize an adjustment of the stage number according to actual production requirements. The electric agitator 1 and the stirring tower plate 4 make the gas-liquid-liquid three phases fully contact, and the pulsed system 11 provides power for the countercurrent flow of the first liquid phase.

Example 1

The example provided a method for lithium recovery by extraction-stripping separation and purification, which was performed by the following steps:

(1) TBP and LIX84 were mixed to form a composite extractant, and a volume ratio of TBP to LIX84 was controlled to be 0.2:1. Sulfonated kerosene was added as a diluent such that the composite extractant had a volume percentage of 20%, and dodecanol was added thereto as a phase modifier with a volume percentage of 5%, obtaining a mixture. The mixture was used to perform an extraction on a solution of lithium battery waste leaching solution with high-valent metal ions being purified (having a lithium concentration of 0.5 g/L and a sodium concentration of 10 g/L) at a pH of 10. A volume ratio of the solution of lithium battery waste leaching solution with high-valent metal ions being purified to the organic phase was controlled to be 2.2:1. Then the extracted mixture was separated to obtain a loaded organic phase with a lithium concentration of 1 g/L.

(2) The lithium-loaded organic phase obtained in step (1) was washed with water for three times, and then was subjected to a gas-liquid-liquid three-phase stripping in a continuous countercurrent extraction tower with a stage number of three. $CO_2$ was used as a gas phase and water was used as a first liquid phase. A volume ratio of water to the loaded organic phase was controlled to be 0.15:1. The stripping system was controlled at a pH of 8, obtaining a stripping solution with a lithium concentration of 6.5 g/L.

(3) The stripping solution obtained in step (2) was subjected to a thermal treatment at 60° C. for 2 h, and was then subjected to a suction filtration to obtain a lithium carbonate product. The mother liquor after precipitating lithium carbonate was returned to the stripping section in step (2).

Example 2

The example provided a method for lithium recovery by extraction-stripping separation and purification, which was performed by the following steps:

(1) TOPO and LIX860 were mixed to form a composite extractant, and a volume ratio of TOPO to LIX860 was controlled to be 1:1. N-dodecane was added as a diluent such that the composite extractant had a volume percentage of 25%, obtaining a mixture. The mixture was used to perform an extraction on a lithium-precipitated mother liquor with a lithium concentration of 2 g/L, a sodium concentration of 50 g/L, a potassium concentration of 25 g/L and a boron concentration of 10 g/L at a pH of 12. A volume ratio of the lithium-precipitated mother liquor to the organic phase was controlled to be 1:1. Then the extracted mixture was separated to obtain a loaded organic phase with a lithium concentration of 2 g/L.

(2) The lithium-loaded organic phase obtained in step (1) was washed with water for three times, and then was subjected to a gas-liquid-liquid three-phase stripping in a continuous countercurrent extraction tower with a stage number of three. $SO_2$ was used as a gas phase and water was used as a first liquid phase. A volume ratio of water to the loaded organic phase was controlled to be 0.1:1. The stripping system was controlled at a pH of 6, obtaining a stripping solution with a lithium concentration of 19.5 g/L.

(3) The stripping solution obtained in step (2) was subjected to an air oxidation at 80° C. for 1 h, and was then subjected to a MVR evaporation to obtain a lithium sulfate product.

Example 3

The example provided a method for lithium recovery by extraction-stripping separation and purification, which was performed by the following steps:

(1) Cyanex923 and LIX54 were mixed to form a composite extractant, and a volume ratio of Cyanex923 to LIX54 was controlled to be 2:1. Sulfonated kerosene was added as a diluent such that the composite extractant had a volume percentage of 15%, obtaining a mixture. The mixture was used to perform an extraction on a concentrated solution of salt lake brine with a lithium concentration of 5 g/L, a sodium concentration of 100 g/L, a potassium concentration of 50 g/L and a boron concentration of 5 g/L at a pH of 13. A volume ratio of the concentrated solution of salt lake brine to the organic phase was controlled to be 0.2:1. Then the extracted mixture was separated to obtain a loaded organic phase with a lithium concentration of 2.4 g/L.

(2) The lithium-loaded organic phase obtained in step (1) was washed with water for four times, and then was subjected to a gas-liquid-liquid three-phase stripping in a continuous countercurrent extraction tower with a stage number of three. $CO_2$ was used as a gas phase and water was used as a first liquid phase. A volume ratio of water to the loaded organic phase was controlled to be 0.25:1. The stripping system was controlled at a pH of 9, obtaining a stripping solution with a lithium concentration of 9.3 g/L.

(3) The stripping solution obtained in step (2) was subjected to a thermal treatment at 80° C. for 0.5 h, and then filtrated to obtain a lithium carbonate product. The mother liquor was returned to the extraction section in step (1).

Example 4

Compared with Example 1, the difference was only in that in step (1), the solution of lithium battery waste leaching solution with high-valent metal ions being purified was replaced by a mixed solution of a lithium ore leaching solution and a lithium-precipitated mother liquor with a lithium concentration of 1.0 g/L, a sodium concentration of 20 g/L and small amounts of other impurities, the volume ratio of the organic phase to the lithium-containing solution was increased to 1:1, and the loaded organic phase had a lithium concentration of 0.99 g/L.

Example 5

Compared with Example 1, the difference was only in that in step (1), the concentration of the solution of lithium battery waste leaching solution with high-valent metal ions being purified was replaced by 0.25 g/L, the volume ratio of the solution of lithium battery waste leaching solution with high-valent metal ions being purified to the organic phase was replaced by 5:1, and the loaded organic phase had a lithium concentration of 1.18 g/L.

Example 6

Compared with Example 1, the difference was only in that in step (1), the volume ratio of the solution of lithium battery waste leaching solution with high-valent metal ions being purified to the organic phase was replaced by 5:1, the pH was increased to 13, and the loaded organic phase had a lithium concentration of 2.48 g/L.

Example 7

Compared with Example 1, the difference was only in that in step (2), the volume ratio of water to the loaded organic phase was replaced by 0.05:1.

Example 8

Compared with Example 1, the difference was only in that in step (1), the volume ratio of TBP to LIX84 was replaced by 2:1.

Example 9

Compared with Example 1, the difference was only in that in step (1), the volume ratio of the solution of lithium battery waste leaching solution with high-valent metal ions being purified to the organic phase was replaced by 5:1.

Example 10

Compared with Example 2, the difference was only in that in step (2), the volume ratio of water to the loaded organic phase was replaced by 2:1.

Comparative Example 1

Compared with Example 1, the difference was only in that in step (1), the composite extractant formed by TBP and LIX84 was replaced by TBP or LIX84 alone. The extraction rate of lithium was lower than 10% in both cases.

Comparative Example 2

Compared with Example 1, the difference was only in that in step (2), the gas used in the gas-liquid-liquid three-phase stripping was replaced by air, and the pH after stripping was 11.2. The stripping rate of lithium was lower than 20%.

Comparative Example 3

Compared with Example 1, the difference was only in that in step (1), the pH of 10 was replaced by a pH of 9. The extraction rate of lithium was 35.3%. There was no industrial economy.

Comparative Example 4

Compared with Example 1, the difference was only in that in step (1), the pH of 10 was replaced by a pH of 14. The extraction rate of lithium was 75.5%. The decrease in extraction rate of lithium is possibly due to the competitive extraction of impurity element Na or K. At the same time, when the pH value was increased, the alkali consumption was increased. Therefore, the practical application was poor in economy.

The assessment of the method for lithium recovery by extraction-stripping separation and purification:

The extraction rates, stripping rates and total recovery rates of lithium in Examples 1-8 and Comparative Examples 1-4 were calculated and assessed, and the results are shown in Table 1.

TABLE 1

Extraction rates, stripping rates and total recovery rates of lithium in Examples 1-8 and Comparative Examples 1-4

| | Lithium content in lithium-containing solution (g/L) | Lithium extraction rate (%) | Lithium stripping rate (%) | Lithium recovery rate (%) | Lithium product purity (%) |
|---|---|---|---|---|---|
| Example 1 | 0.5 | 96.0 | 92.9 | 89.2 | 99 |
| Example 2 | 2.0 | >99.9 | 97.5 | >97.4 | 97 |
| Example 3 | 5.0 | 96.0 | 93.0 | 89.3 | 99 |
| Example 4 | 1.0 | 99.0 | 92.3 | 91.4 | 98 |
| Example 5 | 0.25 | 92.4 | 91.8 | 84.8 | 97 |
| Example 6 | 0.5 | 99.2 | 90.5 | 89.8 | 98 |
| Example 7 | 0.5 | 92.5 | 93.4 | 84.5 | 99 |
| Example 8 | 0.5 | 98.5 | 91.5 | 90.1 | 98 |
| Example 9 | 0.5 | 92.1 | 90.3 | 83.2 | 98 |
| Example 10 | 2.0 | >99.9 | 99.2 | >99.1 | 96.5 |
| Comparative Example 1 | 0.5 | <10 | — | — | — |
| Comparative Example 2 | 0.5 | 96.0 | <20 | <19.2 | — |
| Comparative Example 3 | 0.5 | 35.3 | — | — | — |
| Comparative Example 4 | 0.5 | 75.5 | — | — | — |

In the present disclosure, the calculation method for the single lithium recovery rate is as below:

$$R_0 = R_1 \times R_2$$

In which $R_0$—single lithium recovery rate, %; $R_1$—single lithium extraction rate, %; $R_2$—single lithium stripping rate, %.

It is known from the analysis on Examples and Comparative Examples that according to the method provided in the present disclosure, the efficient recovery and purification of lithium is realized by using the composite extractant, and the extraction rate of lithium is 92% or higher; the gas-liquid-liquid three-phase continuous stripping is performed, and the stripping rate of lithium is 90% or higher; the total yield of lithium is 83% or higher, and the lithium product obtained has a purity of 96% or higher. The method has a high efficiency and a strong industrial practicability.

The applicant stated that specific examples are used to explain the features of the present disclosure, but the present disclosure is not limited to the above features, that is, it does not mean that the present disclosure must rely on the above features for implementation. Those skilled in the art should understand that any improvement of the present disclosure, equivalent substitution of the method according to the present disclosure, addition of the auxiliary method and selection of the specific method, all fall within the protection scope and disclosure of the present disclosure.

What is claimed is:

1. A method for lithium recovery by extraction-stripping separation and purification, comprising:
    (1) performing an extraction on a lithium-containing solution using an extraction system comprising a composite extractant at a pH in a range of 10-13 and separating to obtain a lithium-loaded organic phase;
    (2) subjecting the lithium-loaded organic phase obtained in step (1) to a gas-liquid-liquid three-phase stripping to obtain a lithium-loaded stripping solution; and
    (3) subjecting the stripping solution obtained in step (2) to a thermal treatment and separating to obtain a lithium product and a separated mother liquor;
    wherein the gas-liquid-liquid three-phase comprises a gas phase, a first liquid phase, and a second liquid phrase;
    in step (2), the gas-liquid-liquid three-phase stripping is controlled at a pH in a range of 6-9; and
    in step (2), the gas phase comprises an acid gas, and the acid gas is introduced continuously;
    wherein in step (2), the gas-liquid-liquid three-phase stripping is operated in a multi-stage continuous countercurrent mode;
    an equipment for the gas-liquid-liquid three-phase stripping comprises any one of a continuous mixing clarification tank, an extraction tower or a centrifugal extractor;
    a stage number of the gas-liquid-liquid three-phase stripping is adjustable between 1 and 10; and
    in step (2), a concentration of lithium in the stripping solution is more than 5 g/L.

2. The method according to claim 1, wherein in step (1), the composite extractant comprises a neutral extractant and a chelating extractant, and the extraction system comprises the composite extractant and a diluent;
    the neutral extractant comprises any one or a combination of at least two selected from the group consisting of tributyl phosphate, di (1-methylheptyl) methyl phosphonate, trioctylphosphine oxide, trioctyl/trihexyl phosphine oxide, and N,N-di (1-methyl heptyl) acetamide; and
    the chelating extractant comprises any one or a combination of at least two selected from the group consisting of 2-hydroxy-5-nonylacetophenone oxime, dodecyl phenyl-methyl-β-diketone, and 2-hydroxy-5-nonylbenzaldehyde oxime.

3. The method according to claim 2, wherein a volume ratio of the neutral extractant to the chelating extractant is in a range of 0.2:1-2:1.

4. The method according to claim 1, wherein the extraction system further comprises a phase modifier.

5. The method according to claim 4, wherein the extraction system comprises a composite extractant, a phase modifier and a diluent; a volume percentage of the composite extractant in the extraction system is in a range of 5-30%, and a volume percentage of the phase modifier is in a range of 0-10%.

6. The method according to claim 1, wherein in step (1), the lithium-containing solution comprises any one or a combination of at least two selected from the group consisting of lithium ore leaching solution, lithium-precipitated mother liquor, lithium battery waste leaching solution and salt lake brine;
   a concentration of lithium in the lithium-containing solution is in a range of 0.25-5 g/L;
   concentrations of main impurity elements of sodium, potassium and boron in the lithium-containing solution are independently in ranges of 10-150 g/L, 0-50 g/L and 0-10 g/L, respectively;
   the lithium-containing solution further comprises metal ions, and the metal ions are selected from the group consisting of rubidium ions, aluminum ions, magnesium ions, cesium ions and calcium ions;
   wherein a volume ratio of the lithium-containing solution to the organic phase of the extraction system is in a range of 0.2:1-5:1; and
   in step (1), a concentration of lithium in the lithium-loaded organic phase is in a range of 0.5-3 g/L.

7. The method according to claim 1, wherein step (1) further comprises washing the lithium-loaded organic phase; and wherein a washing solution is water and/or a lithium-containing solution.

8. The method according to claim 1, wherein the acid gas in the gas phase comprises any one or a combination of at least two selected from the group consisting of $SO_2$, $SO_3$, $CO_2$ and $Cl_2$.

9. The method according to claim 8, wherein the acid gas in the gas phase is $SO_2$ and/or $CO_2$.

10. The method according to claim 1, wherein the first liquid phase comprises water.

11. The method according to claim 1, wherein the second liquid phase comprises the lithium-loaded organic phase.

12. The method according to claim 1, wherein a volume ratio of the first liquid phase to the second liquid phase is in a range of 0.05:1-2:1.

13. The method according to claim 1, wherein in step (3), the thermal treatment is performed by any one or a combination of at least two selected from the group consisting of oxidation, evaporative crystallization and thermal decomposition;
   the thermal treatment is performed at a temperature in a range of 60-90° C.;
   the thermal treatment is performed for 0.5-2 h; an oxidant used in the oxidation comprises air, oxygen and ozone gas;
   the evaporative crystallization is performed by MVR or multi-effect evaporation; and
   the thermal decomposition is performed in a closed or semi-closed container.

14. The method according to claim 1, wherein in step (3), the separation is performed by any one or a combination of at least two selected from the group consisting of filtration, suction filtration and centrifugation.

15. The method according to claim 1, wherein the lithium product comprises lithium sulfate, lithium chloride or lithium carbonate, and the product has a purity of higher than 96%.

16. The method according to claim 1, wherein in step (3), the separated mother liquor is returned to step (1) and/or the first liquid phase in step (2).

* * * * *